United States Patent [19]

Nakauchi et al.

[11] 4,339,185

[45] Jul. 13, 1982

[54] IMAGE INFORMATION INPUT SYSTEM

[75] Inventors: Kenji Nakauchi; Takaaki Terasita, both of Minami-ashigara, Japan

[73] Assignee: Fuji Photo Film Co., Ltd., Kanagawa, Japan

[21] Appl. No.: 218,562

[22] Filed: Dec. 22, 1980

[30] Foreign Application Priority Data

Dec. 21, 1979 [JP] Japan .................. 54-166688

[51] Int. Cl.³ .............................................. G03B 7/08
[52] U.S. Cl. ........................................ 354/31; 354/59; 354/25
[58] Field of Search .......................... 354/31, 59, 25

[56] References Cited

U.S. PATENT DOCUMENTS

| 4,047,187 | 9/1977 | Masnimo et al. | 354/31 |
| 4,075,640 | 2/1978 | Ueda et al. | 354/31 |
| 4,104,654 | 8/1978 | Maitani et al. | 354/31 |
| 4,182,573 | 1/1980 | Yamada et al. | 354/31 |

FOREIGN PATENT DOCUMENTS

| 46-8516 | 3/1971 | Japan . |
| 49-90926 | 8/1974 | Japan . |
| 49-90927 | 8/1974 | Japan . |
| 51-9271 | 3/1976 | Japan . |
| 51-75442 | 6/1976 | Japan . |
| 51-92622 | 8/1976 | Japan . |
| 53-13412 | 2/1978 | Japan . |
| 53-71834 | 6/1978 | Japan . |
| 53-96829 | 8/1978 | Japan . |
| 53-118127 | 10/1978 | Japan . |
| 54-91224 | 7/1979 | Japan . |

Primary Examiner—Russell E. Adams
Attorney, Agent, or Firm—Pasquale A. Razzano, Curtis, Morris & Safford

[57] ABSTRACT

In a camera or a printer, exposure is controlled based on a selected mode of light measuring means which has a number of different modes of weighting for differently weighting various parts of an image in light measurement. In the light measuring means, there are provided a number of image information operating means which have different ways of weighting various parts of an image. The weighting mode is properly selected according to the kind of the scene of the image. The light measuring means comprises a number of photodetectors arranged in the form of arrays and a number of operating means for weighting the outputs of the photodetectors in different ways.

21 Claims, 12 Drawing Figures

FIG.1
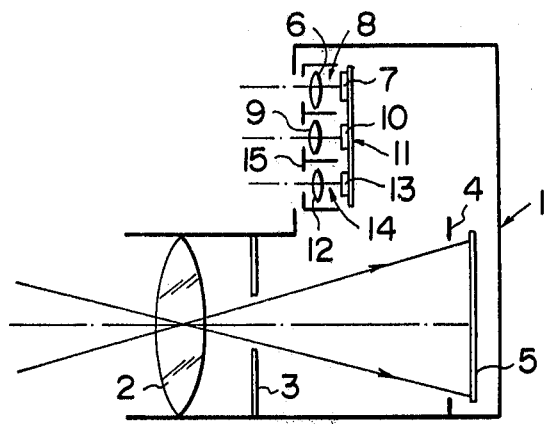
FIG.4
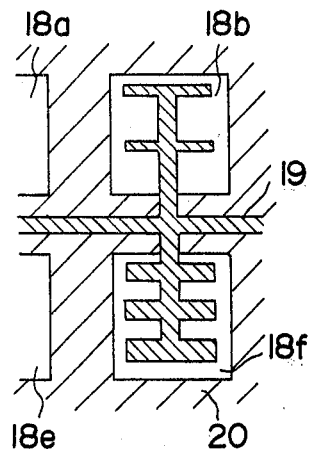
FIG.2
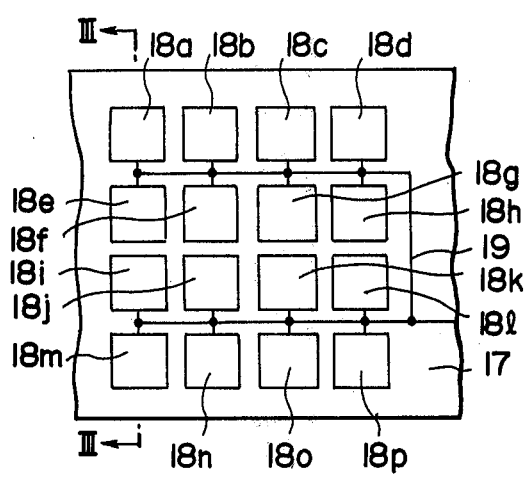
FIG.5A
| 5 | 2 | 2 | 5 |
|---|---|---|---|
| 4 | 9 | 9 | 4 |
| 4 | 15 | 15 | 4 |
| 5 | 6 | 6 | 5 |
FIG.5B
| 2 | 1 | 1 | 2 |
|---|---|---|---|
| 2 | 0 | 0 | 2 |
| 1 | 5 | 5 | 1 |
| 4 | 2 | 2 | 4 |
FIG.6
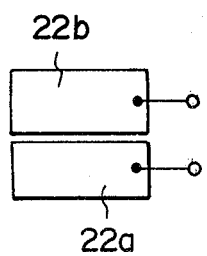
FIG.3
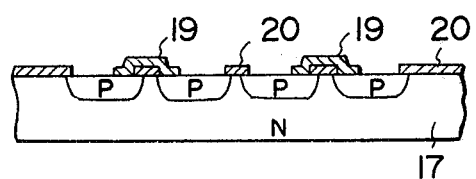

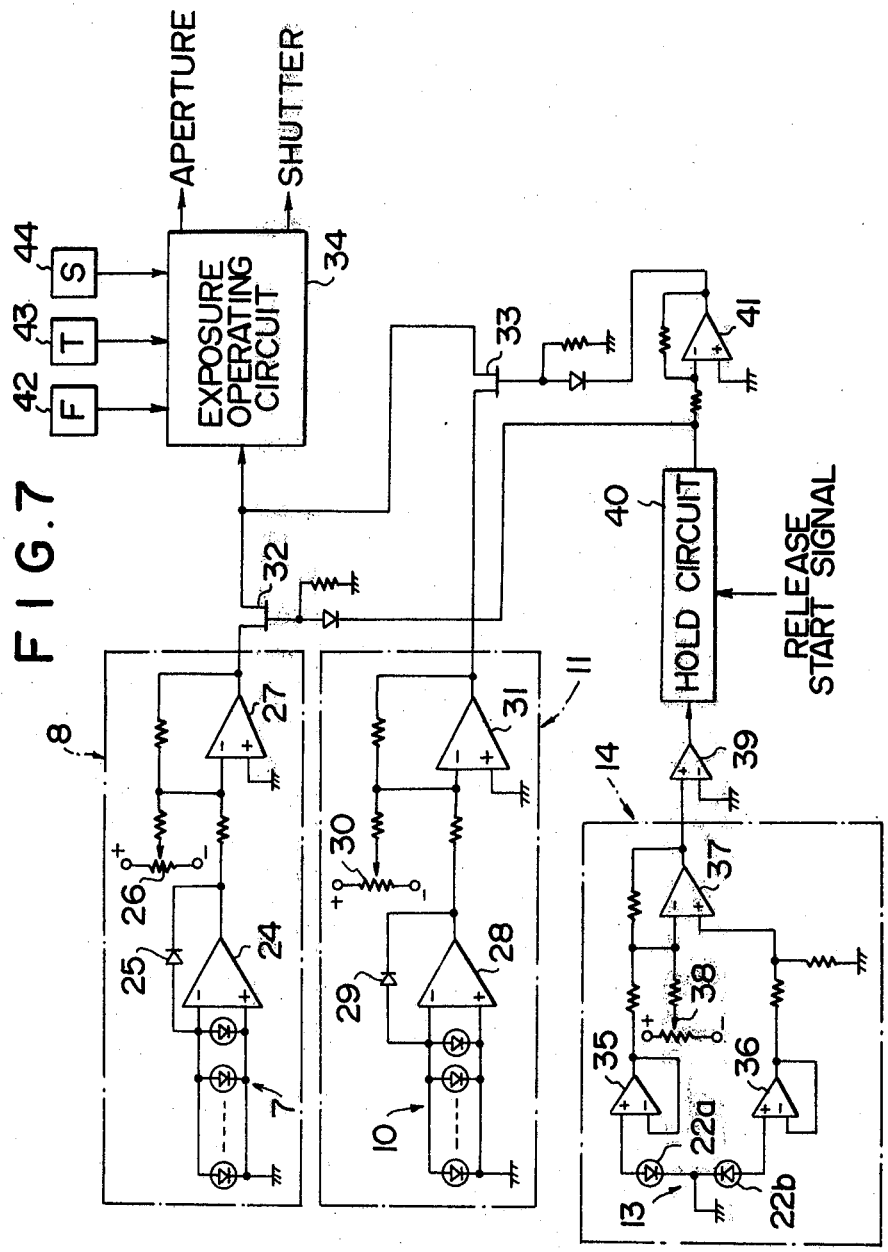

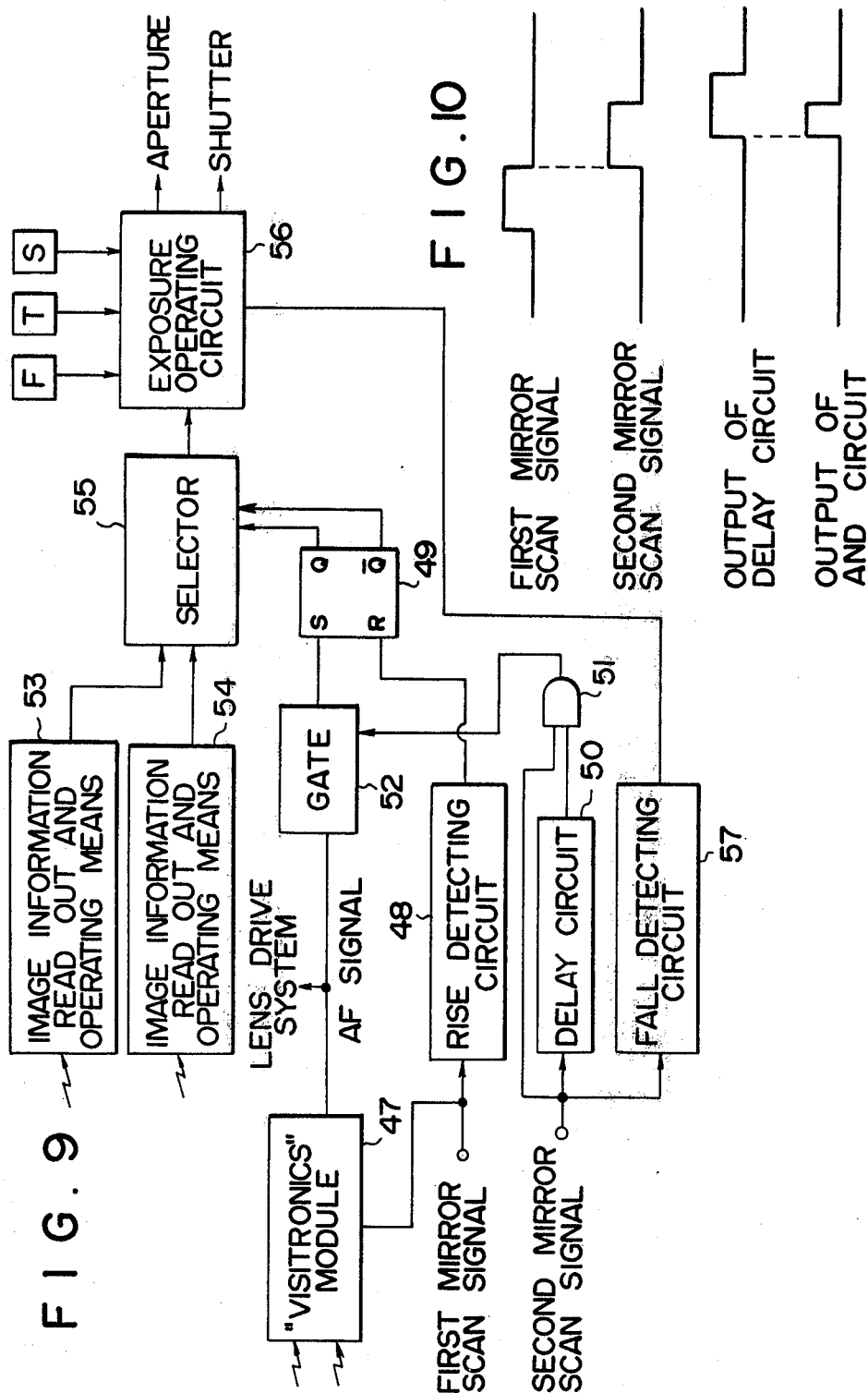

ic camera or a photographic printer in which various parts of an image are differently weighted for providing modified image information according to the kind of the scene of the image.

IMAGE INFORMATION INPUT SYSTEM

BACKGROUND OF THE INVENTION

1. Field of the Invention

This invention relates to an image information input system, and more particularly relates to a system for inputing image brightness information into an exposure control system for use in a photographic camera or a photographic printer in which various parts of an image are differently weighted for providing modified image information according to the kind of the scene of the image.

2. Description of the Prior Art

There have been known various kinds of light measuring system such as averaged light measuring, center-weighted measuring and partial measuring. In the averaged light measuring, the averaged value of the amount of light from the whole scene viewed by the taking lens of the camera is measured by use of a photodetector which has substantially the same angle of view as that of the taking lens. In this light measuring system, it is impossible to obtain a proper exposure of the subject matter of photography in case that there is a bright background behind the subject matter such as the sky or back light. Though it is known to correct the exposure controlled by the averaged light meaasuring by use of a correction means which effects increase or decrease of the measured values, it is troublesome to operate such a correcting means and it is difficult to accurately correct the exposure by the optimum amount.

In the center-weighted measuring, the central part of an image is weighted in comparison with the marginal part. In the partial measuring, only a part of an image is measured. These two light measuring systems are based on an empirical rule that the subject matter of photography is normally located around the center of the scene aimed by a camera and weights the central part in comparison with the marginal part to lower the weight of the brightness information of the marginal part of a scene. Accordingly, these two light measuring systems are disadvantageous in that the exposure cannot be properly controlled based thereon in case that the subject matter is not located around the center of a scene or the difference in brightness between the central part and the marginal part is too large.

Beside the above mentioned light measuring systems, there have been known in the art to use the maximum and minimum values of the brightness of some parts of a scene to obtain more practical information as disclosed in Japanese Unexamined Patent Publication Nos. 92622/1976, 13412/1978, 91224/1979 and Japanese Utility Model Publication No. 9271/1976, and to divide the scene into the upper half and the lower half to obtain information of these halves separately as disclosed in Japanese Unexamined Patent Publication Nos. 75442/1976, 96829/1978, 90926/1974, 90927/1974, 71834/1978, 118127/1978 and Japanese Patent Publication No. 8516/1971.

The above-mentioned various kinds of light measuring systems, however, are all disadvantageous in that it is very difficult to provide the optimum light measuring or the optimum image information for any kind of scene. In other words, the above systems are effective for a few particular kinds of scene but not for all kinds of scene, because the photodetectors and the measured value operating circuit are always the same for any kind of scene.

SUMMARY OF THE INVENTION

The primary object of the present invention, therefore, is to provide an image information input system which is capable of providing the optimum value or image information for any kind of scene.

Another object of the present invention is to provide an image information input system which is able to change its mode of weighting according to the kind of the scene and the position of the subject matter in the scene.

Still another object of the present invention is to provide an image information input system which is able to properly select the mode of weighting automatically according to the kind of the scene by use of a scene classifying means.

The above objects of the present invention are accomplished by using a number of image information operating means having different ways of weighting various parts of a scene and a selecting means for selecting a proper one out of the number of image information operating means according to the kind of a given scene.

In general, in case that the difference in brightness between the subject matter and the background is small, the averaged light measuring is desirable. On the contrary, in case that the difference in brightness therebetween is large, the center-weighted light measuring is desirable. Further, in case that the scene includes a bright sky background, the lower part weighted light measuring is desirable. Furthermore, in case that the scene includes a light source, it is desirable to use the minimum brightness for controlling exposure.

In view of this observation, it is desirable that the light measuring mode be properly selected according to the kind of the scene. The present invention, therefore, is based on this concept and is provided with a number of different image information read-out and operating means to be properly selected according to the kind of the scene.

As for the image information read-out and operating means, there may be used either a mask-weighting system in which a mask for differently weighting a number of photodetectors by changing the light receiving area of the photodetectors is used and the outputs of the photodetectors are properly modified by addition and-/or subtraction, or a minimum and maximum detecting system in which all the parts of the scene are uniformly measured without using a mask and the minimum and maximum values of the brightness are detected to provide the optimum image information thereby alone or together with the averaged brightness.

The selection of the proper image information read-out and operating means may be made manually or preferably automatically by means of a scene classifying device. The scene classifying device can be made by utilizing the outputs of the photodetectors which measure the brightness of various parts of a scene. By the output of the scene classifying device, the image information read-out and operating means is properly selected.

The scene classifying device may be of the type which meaasures the upper half and the lower half of the scene separately to classify the scene. Further, the scene classifying device may be connected with or comprised of a distance measuring means because the desirable mode of light measuring depends sometimes upon the distance of the subject matter from the camera. For instance, in case that the distance of the subject matter is small, the center-weighted light measuring is desirable since the subject matter is mostly located at the center of the scene in such a case. In case that the distance of the scene is long, the lower part weighted light measuring is desirable since in such a case the upper portion of the scene is often occupied by the sky.

As the photodetector for the above mentioned scene classifying device is preferably used a photodiode since the size thereof is small and the circuit therefor can be made simple. On the other hand, the image information read-out and operating means for measuring the brightness is advantageously able to use the photocurrent of the photodiodes in accurately reading out the information owing to the high accuracy and desirable temperature characteristics of the photodiodes.

BRIEF DESCRIPTION OF THE DRAWINGS

FIG. 1 is a schematic side sectional view showing an example of a photographic camera in which the image information read-out and operating means is provided in accordance with the present invention, FIG. 2 is a fragmentary front view showing the arrangement of the photodetector array employed in an embodiment of the present invention, FIG. 3 is a fragmentary sectional view showing the photodetector array as shown in FIG. 2 taken along line III—III, FIG. 4 is an enlarged fragmentary front view of the photodetector array in which a mask is employed for the purpose of weighting the photodetectors, FIGS. 5A and 5B are examples of weighting of the photodetector arrays, FIG. 6 is a front view showing an example of a photodetector array to be used for classifying the scene, FIG. 7 is a circuit view showing an example of an electric circuit for the image information input system in accordance with an embodiment of the present invention, FIG. 9 is a circuit view showing an example of the selecting means which selects the image information read-out and operating means in accordance with the distance information from a distance measuring means, FIG. 10 is a timing chart showing the timings of various signals used in the circuit as shown in FIG. 9.

DESCRIPTION OF THE PREFERRED EMBODIMENTS

Figure 8:
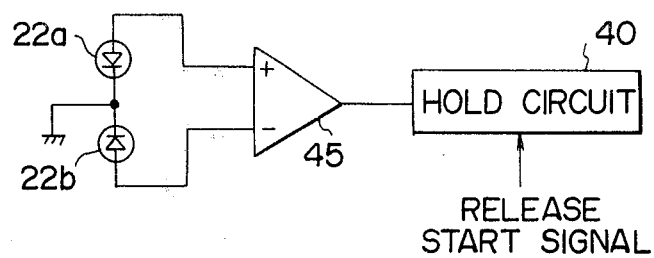
FIG. 8 is a circuit view showing an example of the scene classifying device to be used in the present invention.

Now the present invention will be described in detail with reference to several preferred embodiments thereof referring to the accompanying drawings. Referring to FIG. 1, a camera body 1 is provided with a taking lens 2 and an aperture 3 through which light from the subject matter enters the camera body and impinges upon a film 5 provided therein through an open shutter 4. In the upper portion of the camera body 1 is located a first image information read-out and operating means 8 including a focusing lens 6 and a first photodetector array 7, and a second image information read-out and operating means 11 including a focusing lens 9 and a second photodetector 10. These image information read-out and operating means 8 and 11 are selectively used according to the classified scene.

Further, a third image information read-out and operating means 14 including a focusing lens 12 and a third photodetector 13 is provided in the camera body 1 for classifying the scene. By the signal from the third image information read-out and operating means, one of the first and second image information read-out and operating means 8,11 is selected and the image information is read-out and operated thereby. Further, it is also possible to select one of these means 8,11 by a distance signal from an automatic focusing means when the camera is provided therewith.

In front of the first, second and third image information read-out and operating means 8,11 and 14 is provided an aperture plate 15 having three apertures for the three lenses 6,9 and 12 of the three image information read-out and operating means.

FIG. 2 shows an example of a photodetector array for measuring the brightness of the scene like said arrays 7 and 10. In this example, sixteen photodetectors (cells) 18a–18p are deposited on an N-type silicon substrate 17. These photodetectors 18a–18p are connected in parallel by lead wires 19 made by vacuum deposited aluminium.

As shown in FIG. 3, the photodetectors 18a–18p are photodiodes made of a p-layer in which impurities are diffused in the N-type silicon substrate 17. Further, on the surface of the N-type silicon substrate 17 there is formed a silicon oxide film in the areas not used for receiving light.

The photodetectors 18a–18p have different light receiving areas so as to be weighted thereby. The weighting pattern of the upper array 7 is made different from that of the lower array 10. Therefore, the same subject matter is measured in the different weighting pattern by the arrays 7 and 10. Accordingly, the image information obtained by the image information read-out and operating means 8 is different from that obtained by the image information read-out and operating means 11 even for the same subject matter.

FIG. 4 shows in detail a part of the photodetector array in which the light receiving areas are changed for different photodetectors for the purpose of weighting. The photodetectors are covered with an aluminium electrode pattern serving as a mask connected integrally with the lead wires 19 and the light receiving area thereof is changed. In FIG. 4, the light receiving area of a photodetector 18b is larger than that of the photodetector 18f. Namely, the weighting value of the photodetector 118b is larger than that of the photodetector 18f.

FIGS. 5A and 5B show examples of the weighting pattern for the arrays 7 and 10, in which FIG. 5A shows the pattern for the upper array 7 and FIG. 5B shows the pattern for the lower array 10. The numerals shown in FIGS. 5A and 5B are relative values with the standard value determined as "1". Actually, the maximum value indicates the position of the photodetectors having no covering mask thereon.

Since the photodetector arrays 7 and 10 may have the size of 1 mm×1 mm and the photodetector array 13 may have the size of 0.6 mm×0.6 mm, these arrays can easily be formed on a monolithic chip. Therefore, the whole device can be made compact and conveniently attached to the camera. Further, the positioning of these arrays can be made by only one action. Further, since the distance between the adjacent arrays is small, the parallax is also made small. Of course, the arrays may be deposited on different chips.

FIG. 6 shows the photodetector array 13 for the third image information read-out and operating means 14, which is composed of a lower photodetector 22a for measuring the brightness of the lower half of the scene and an upper photodetector 22b for measuring the brightness of the upper half of the scene. Since the scene including a bright sky is liable to be exposed with under exposure for the subject matter, it is desirable to make this kind of scene classified out of the other kinds of scene for proper exposure control therefor. This classification can be made by use of the large difference in brightness between the upper and lower half of the scene.

FIG. 7 is a circuit view showing the circuit of the image information input system of this invention according to an embodiment thereof. The photodetector array 7 weighted as mentioned hereinbefore has a number of photodetectors connected in parallel with each other and connected with two input terminals of an operational amplifier 24. The operational amplifier 24 is used for impedance conversion. The photodetector array 7 is used in the form that a photocurrent is utilized with the both ends of the photodiodes short-circuited. A log-converted photovoltage and the voltage determined by the potentiometer 26 are inputed into an operational amplifier 27, where these voltages are summed and amplified.

Therefore, by the operational amplifiers 24 and 27 the following operation is conducted $$B = \left\{ \log\left(\sum_{i=1}^{16} I_i\right) + C_1 \right\} \times K_1$$

where the photocurrent of the photodetectors is represented by $I_1$-$I_{16}$. The voltage of the potentiometer is $C_1$, the brightness of the subject matter is B, and the gain of the latter step operational amplifier is $K_1$.

Similarly, the photocurrent of the photodetector array 10 is subjected to impedance conversion by an operational amplifier 28 and log conversion by a log diode 29. Further, the output of the operational amplifier 28 and the constant voltage from the potentiometer 30 are summed at an operational amplifier 31 and amplified.

The output terminals of the operational amplifiers 27 and 31 are connected to analog switches 32 and 33, respectively. According to the classification of the scene, one of the analog switches 32,33 is turned ON and the output signal of the operational amplifier 27 or 31 is forwarded to the exposure operating circuit 34.

The photodetectors 22a and 22b of said third image information read-out and operating means 13 are connected with operational amplifiers 35 and 36 at the anode thereof, respectively, and the output of the photodetectors 22a and 22b is subjected to impedance conversion thereby. At an operational amplifier 37 connected with the output of the operational amplifiers 35 and 36, the output of the operational amplifier 36 is subtracted from the sum of the output of the potentiometer 38 and the output of the operational amplifier 35, and the result of the subtraction is amplified and inputted into a comparator 39 for positive-negative determination. The output of the comparator 39 is sent to a hold circuit 40, where the input signal given thereto is held for a while. This hold circuit 40 is provided for the purpose of preventing an unstable signal from being outputted when the analog switches 32,33 are changed over upon shutter release. In other words, when the classification of the scene is changed at the time of shutter release, the analog switches 32,33 are changed over from one to the other. At this time, the output signal becomes temporarily unstable due to the transition characteristics of the switches. Therefore, the input signal into the analog switches 32,33 is held for a while upon receipt of a release start signal from a switch (not shown) turned on by depression of a shutter button. Further, it will be noted that the hold circuit 40 may be provided at the input of the exposure operating circuit 34 so as to hold the output signal from the analog switch 32 or 33.

Said comparator 39 determines whether or not the difference in brightness between the upper half of the scene and the lower half of the scene is larger than a predetermined value set by the potentiometer 36, and further determines which half is larger. In other words, it is determined by the comparator 39 whether or not the scene includes bright sky. When the bright sky is included, the output of the comparator 39 is in the "L" (low) level and the analog switch 32 is turned OFF. The "L" signal is inverted by an inverter 41 and the analog switch 33 is turned ON. Therefore, the image information or the subject matter brightness information measured by the second image information read-out and operating means 11 is sent to the exposure operating circuit 34. When the bright sky is not included in the scene, the subject matter brightness information measured by the first operating means 8 is sent to the exposure operating circuit 34 by way of the other analog switch 32. The exposure operating circuit 34 is, as is well known in the art, an exposure control circuit for controlling an aperture or a shutter according to input exposure information consisting of a film sensitivity inputted by a film sensitivity input circuit 44 and either the aperture value information inputed by an aperture input circuit 42 or the shutter speed information inputted by a shutter speed input circuit 43, and also the image brightness information given by the image information read-out and operating means 8 or 11. It is also possible to control both the aperture size and the shutter speed based only on the film sensitivity and the scene brightness as is known in the conventional programmed exposure control.

FIG. 8 shows an example in which the structure of the circuit is simplified by directly inputting the output of the photodetectors for classification into the comparator. In this example, the anodes of two photodetectors 22a and 22b are connected with a comparator 45 for comparing the photo-electro motive force of the two photodetectors 22a and 22b.

When the camera-to-object distance of the subject matter is small, the center-weighted light measuring is desirable. Further, when the camera-to-object distance of the subject matter is large, it is desirable to measure a comparatively large area weighted in the lower half of the scene to reduce the influence of the bright sky. Thus, it is desirable to give the distance information to the image information input system of this invention in which the mode of weighting is selected. Such an example will hereinbelow be described referring to FIG. 9.

FIG. 9 shows such an example in which the image information read-out and operating means is selected by use of the distance information from a distance detecting device. In the example shown in FIG. 9, a distance detecting device is in the form of a module ("VISITRONICS" module made by Bell & Howell Company) 47 in which two sets of photodetector arrays are provided in front of one of which is located a scanning mirror and in front of the other of which is located a fixed mirror. The light from the subject matter is reflected by these mirrors and received by the two sets of photodetector arrays. As the scanning mirror in front of one of the photodetector arrays rotates, the output of the array changes. When the output of the array becomes equal to that of the other array receiving light reflected by the fixed mirror, the angle of the scanning mirror indicates the distance of the subject matter. In the practical operation of the "VISITRONICS" module, the scanning mirror is moved to scan the object twice. In the first scan, the module obtains the absolute value of the difference between the outputs of the two sets of photodetector arrays and further obtains the difference of the absolute value from a predetermined constant value. Then, the maximum value of the difference is held. The maximum means the minimum of the difference between the outputs of the two photodetector arrays in the module. Therefore, the position where the difference between the absolute value of the difference between the two outputs and the predetermined constant value becomes maximum is the best focusing position. Then, in the second scan, the taking lens of the camera is moved in association with the scanning mirror and when the output of the module becomes equal to the above detected maximum value obtained in the first scan, an AF (auto-focus) signal is generated for indicating the detection of the focusing position. By the AF signal, the solenoid is operated and the moving lens is stopped to make automatic focusing.

As shown in FIG. 10, in the course of scanning of the scanning mirror a mirror scan signal is generated to show the duration of the mirror scanning operation. In the first scan, the first mirror scan signal is sent to the distance detecting module 47 and also to a rise detecting circuit 48 for holding said maximum value. By the output of the rise detecting circuit 48, a flip-flop 49 is reset. In the second scan, the second mirror scan signal is sent to an AND gate 51 after having been delayed by a certain delay time period by a delay circuit 50. Since the AND gate 51 is provided also with a non-delayed mirror scan signal, there is obtained a logical product of the two signals. Thus, the AND gate 51 provides a signal which indicates that the subject matter distance is longer or shorter than a predetermined distance. By this signal, another gate circuit 52 is opened or closed. In other words, when the distance is longer than the predetermined distance, the gate circuit 52 is opened. If an AF signal is outputted while the gate circuit 52 is opened, the flip-flop 49 is set. If the AF signal is outputted while the gate circuit 52 is closed, on the contrary, the flip-flop 49 is not set. Therefore, by the set or reset of the flip-flop 49 it is known if the subject matter distance is longer or not. Consequently, the output of the flip-flop 49 can be used for selecting the image information read out and operating means.

The output of the flip-flop 49 is connected with a selector 55 connected with a first image read-out and operating means 53 having a center-weighted photodetector array and a second image read-out and operating means 54 having a lower half-weighted photodetector array. The selector 55 selects one of the image read-out and operating means 53 or 54 according to the signal from the flip-flop 49 and transmits the output thereof to an exposure operating circuit 56.

The exposure operating circuit 56 receives a signal from a fall detecting circuit 57 which receives said second mirror scan signal and detects the fall thereof, and starts it operation upon receipt of the signal from the fall detecting circuit 57. This is because it is necessary to start automatic exposure control after completion of the focusing operation since the final selection by the selector 55 is made after set of the flip-flop 49 that is made in the latter half of the scan by the scanning mirror.

It will be understood that all the photodetector arrays used in the "VITRONICS" module and the first and second image information read-out and operating means 53,55 can be deposited on the same IC chip. This will make the mounting and adjusting of the photodetector arrays very simple and all such inserting and adjusting steps can be made at the time, which results in lowering of the manufacturing cost.

In the above described embodiments, a number of photodetectors are used and weighting is made with respect to the respective photodetectors. In the embodiment in which the total of the outputs of the weighted photodetectors is used as the scene brightness information, the total value corresponds to an output of a single photodetector having a wide light receiving area and being covered with a mask having a complex pattern to provide weighting of various parts of the scene. Therefore, it should be noted that an embodiment using a single photodetector having a wide light receiving area covered with a mask is also included in the present invention.

Figure 11:
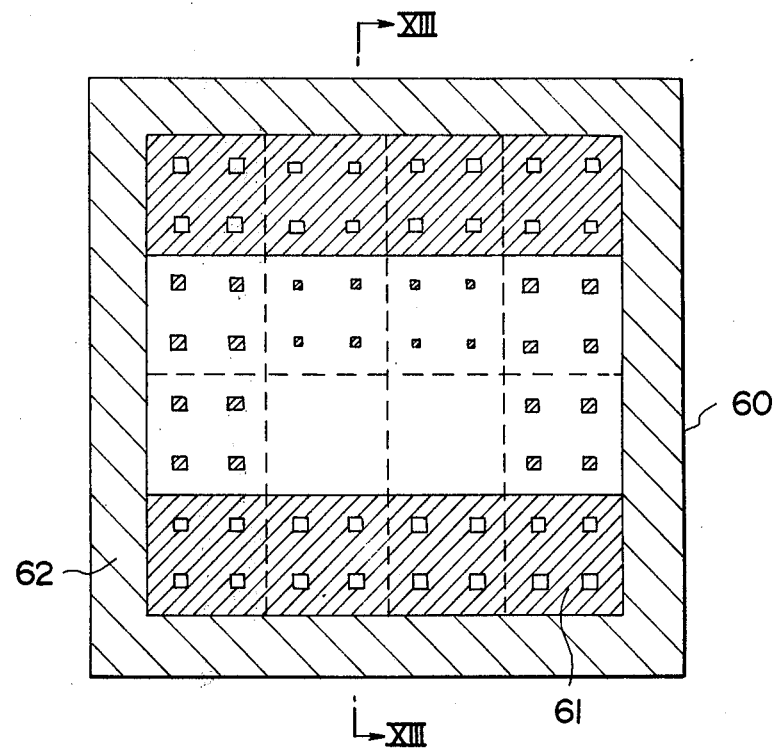
FIG. 11 is a plan view showing another example of the photodetector array which can be used in the present invention.
Figure 12:
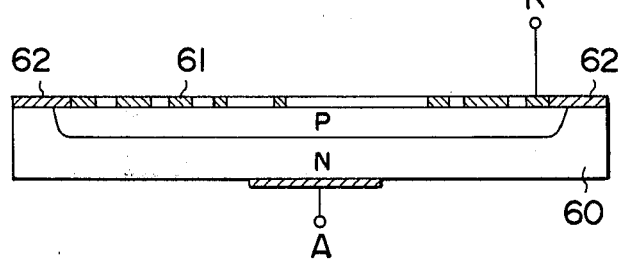
FIG. 12 is a sectional view showing the section of the photodetector array as shown in FIG. 11.

FIGS. 11 and 12 show such an example in which a wide p-layer is deposited on an N-type silicon substrate 60 to make a single photodiode. In FIG. 11, there are shown broken lines to indicate an example of dividing the single photodiode into a number of smaller photodiodes as the abovedescribed embodiments. On the surface of the p-layer there is provided a mask 61 having a shape or a covering distribution as shown by hatches. With the mask 61, the light impinging upon the photodiode is prevented from reaching the p-layer and accordingly only the white portions shown in FIG. 11 are exposed to light. The mask 61 is preferably formed of aluminium, and it is desirable that the surface of the aluminium is provided with an insulating layer of $SiO_2$. Around the p-layer of the photodiode there is deposited a silicon oxide film 62 for insulating the surface of the photodiode.

In the above described various embodiments of this invention, different kinds of weighting pattern are used. However, it will be understood that the present invention can be used with an image information read-out means which calculates the brightness information by using various characteristic values such as minimum and maximum brightness measured by use of a light measuring means which uniformly measures the brightness all over the scene without using any weighting mask or the like.

We claim:

1. An image information input system for use in a photographic camera or the like for inputting image brightness information of a subject matter into an exposure control system, said image information input system comprising;

a plurality of image information read-out and operating means each including a photodetector, with weighting mask means thereon at least partially covering a photosensitive surface thereof for measuring the brightness of various parts of the subject matter and outputting a brightness signal indicative of the total brightness measured by the photodetector, said plurality of image information read-out and operating means having different respective modes of light measuring for providing differently weighted brightness measurements of the subject matter, and selecting means for selecting automatically the brightness measurement of one of said plurality of image information read-out and operating means according to the visual nature of the subject matter.

2. An image information input system as defined in claim 1 wherein said photodetector comprises a number of photodetectors elements, and a weighting means for differently weighting said elements.

3. An image information input system as defined in claim 2 wherein said weighting means is a mask situated on the photodetector for covering the photodetector elements with different covering areas.

4. An image information input system as defined in claim 1 wherein said photodetector comprises a single photodetector and a weighting mask means covered thereon.

5. An image information input system as defined in claim 1 wherein one of said plurality of image information read-out and operating means is a center-weighted light measuring means providing a center-weighted brightness output signal.

6. An image information input system as defined in claim 5 wherein another of said plurality of image information read-out and operating means is an averaged light measuring means.

7. An image information input system as defined in claim 5 or 6 wherein still another of said plurality of image information read-out and operating means is a lower-half-weighted light measuring means.

8. An image information input system as defined in any one of claims 1 to 6 wherein said photodetectors are formed on a monolithic integrated circuit chip.

9. An image input system for use in a photographic camera or the like for inputting image brightness information of a subject matter into an exposure control system, said image information input system comprising:

a plurality of image information read-out and operating means each including a photodetector for measuring the brightness of various parts of the subject matter and outputting a brightness signal indicative of the total brightness measured by the array, said plurality of image information read-out and operating means having different respective modes of light measuring for providing differently weighted brightness signals for the subject matter, classifying means for classifying the subject matter as to type thereof, and selecting means responsive to an output of said classifying means for selecting one of said plurality of image information read-out and operating means.

10. An image information input system as defined in claim 9 wherein said photodetector comprises a number of photodetector elements, and a weighting means for differently weighting said photodetectors.

11. An image information input system as defined in claim 10 wherein said weighting means is a mask disposed on the photodetector for covering the photodetector elements with respective different covering areas.

12. An image information input system as defined in claim 9 wherein said photodetector is formed of a single photodetector element with weighting mask means covering at least a portion of a photosensitive surface thereof.

13. An image information input system as defined in claim 9 wherein one of said plurality of image information read-out and operating means is a center-weighted light measuring means providing a center-weighted brightness output signal.

14. An image information input system as defined in claim 13 wherein another of said plurality of image information read-out and operating means is an averaged light measuring means.

15. An image information input system as defined in claim 13 wherein another of said plurality of image information read-out and operating means is a lower-half-weighted light measuring means.

16. An image information input system as defined in claim 9 wherein said classifying means comprises a plurality of photodetectors positioned at different positions in an image of the subject matter, and operating means connected with the output of the photodetectors for operating the output signals from the plurality of photodetectors.

17. An image information input system as defined in claim 16 wherein said plurality of photodetectors of the classifying means comprises a first photodetector located in the upper half of the image to measure the brightness of the upper half of the subject matter scene and a second photodetector located in the lower half of the image to measure the brightness of the lower half of the subject matter scene, and said operating means of the classifying means comprises a classification output means which determines whether the difference in brightness between the upper half and the lower half of the subject matter scene is larger than a predetermined value and provides an output indicating a first classification when said difference is smaller than said predetermined value or a second classification when said difference is larger than said predetermined value.

18. An image information input system as defined in claim 17 wherein one of said plurality of image information read-out and operating means is a center-weighted light measuring means providing a center-weighted brightness output signal and another of said plurality of image information read-out and operating means is a lower-half-weighted light measuring means providing a lower-half-weighted brightness output signal, and said selecting means selects said center-weighted light measuring means when said classification output means determines that said difference in brightness between the upper half and the lower half of the subject matter scene is smaller than said predetermined value and selects said lower-half-weighted light measuring means when said classification output means determines that said difference in brightness is larger than said predetermined value.

19. An image information input system as defined in claim 9 wherein said classifying means is connected to a hold circuit which holds the output of the classifying means upon receipt of a release start signal from a shutter release means.

20. An image information input system as defined in claim 9 wherein said classifying means includes distance detecting means for determining the distance of the subject matter and outputting a classification signal indicating whether the distance is longer than a predetermined value or shorter than the same.

21. An image information input system as defined in claim 20 wherein one of said plurality of image information read-out and operating means is a center-weighted light measuring means providing a center-weighted brightness output signal and another of said plurality of image information read-out and operating means is a lower-half-weighted light measuring means providing a lower-half-weighted brightness output signal, and said selecting means selects said center-weighted light measuring means when said distance detecting means outputs a classification signal indicating that the distance of the subject matter is shorter than said predetermined value and selects said lower-half-weighted light measuring means when said distance detecting means outputs a classification signal indicating that the distance is longer than said predetermined distance.

* * * * *